United States Patent
Yang et al.

(10) Patent No.: US 11,320,989 B2
(45) Date of Patent: May 3, 2022

(54) WEAR LEVELING AND ACCESS METHOD AND DEVICE FOR NON-VOLATILE MEMORY, AND STORAGE MEDIUM

(71) Applicant: ZTE CORPORATION, Guangdong (CN)

(72) Inventors: Hongzhang Yang, Guangdong (CN); Yaofeng Tu, Guangdong (CN); Guihai Chen, Guangdong (CN); Bin Guo, Guangdong (CN); Yinjun Han, Guangdong (CN); Zongshuai Yan, Guangdong (CN); Zhenjiang Huang, Guangdong (CN); Hong Gao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/261,566

(22) PCT Filed: Apr. 1, 2019

(86) PCT No.: PCT/CN2019/080815
§ 371 (c)(1),
(2) Date: Jan. 19, 2021

(87) PCT Pub. No.: WO2020/015385
PCT Pub. Date: Jan. 23, 2020

(65) Prior Publication Data
US 2021/0271398 A1    Sep. 2, 2021

(30) Foreign Application Priority Data

Jul. 20, 2018  (CN) .......................... 201810802096.1
Jul. 25, 2018  (CN) .......................... 201810824443.0

(51) Int. Cl.
*G06F 3/06*    (2006.01)
*G06F 13/16*   (2006.01)
*G06F 12/02*   (2006.01)

(52) U.S. Cl.
CPC ............ *G06F 3/0616* (2013.01); *G06F 3/065* (2013.01); *G06F 3/0647* (2013.01);
(Continued)

(58) Field of Classification Search
None
See application file for complete search history.

(56) References Cited

U.S. PATENT DOCUMENTS

2016/0147467 A1* 5/2016 Roberts ............... G06F 12/0238
                                                         711/103
2017/0286293 A1* 10/2017 Gayman ............. G06F 12/0646
(Continued)

FOREIGN PATENT DOCUMENTS

CN            105068938 A       11/2015

OTHER PUBLICATIONS

International search report of PCT Patent Application No. PCT/CN2019/080815 dated Jul. 1, 2019.

*Primary Examiner* — Michael Alsip

(57) ABSTRACT

A wear leveling and access method and device for a non-volatile memory, and a storage medium. The method includes: logically dividing a non-volatile memory into physical units of p levels, the non-volatile memory including a plurality of physical units of the first level, each physical unit of the p−1-th level including a plurality of physical units of the p-th level, and p being a positive integer greater than one (S110); when a time period corresponding to the physical units of the q-th level arrives, replacing the data of each
(Continued)

logically divide the non-volatile memory into p levels of physical units, the non-volatile memory including a plurality of $1^{st}$-level physical units, and each $(p-1)^{th}$-level physical unit including a plurality of $p^{th}$-level physical units, p being a positive integer greater than 1 — S110 migrate, when a time cycle corresponding to $q^{th}$-level physical units arrives, data in each of the $q^{th}$-level physical units to another $q^{th}$-level physical unit, q being any positive integer from 1 to p — S120 of the physical units of the q-th level with other physical units of the q-th level, q being any positive integer from one to p (S120).

14 Claims, 6 Drawing Sheets

(52) U.S. Cl.
CPC .......... *G06F 3/0653* (2013.01); *G06F 3/0665* (2013.01); *G06F 3/0679* (2013.01); *G06F 13/1668* (2013.01)

(56) References Cited

U.S. PATENT DOCUMENTS

2018/0107386 A1    4/2018  Ahn
2018/0113636 A1*  4/2018  Kwon .................. G06F 3/0688

* cited by examiner

Rotation and migration of segment data with time cycle being A

| Before migration | Segment A | Segment B | Segment C |
|---|---|---|---|

| After migration | Segment C | Segment A | Segment B |
|---|---|---|---|

Rotation and migration of page data in segments with time cycle being B

Before migration:

Segment A: | 0 | 1 | 2 | 3 | 4 |

Segment B: | 5 | 6 | 7 | 8 | 9 |

Segment C: | 10 | 11 | 12 | 13 | 14 |

After migration:

Segment A: | 4 | 0 | 1 | 2 | 3 |

Segment B: | 9 | 5 | 6 | 7 | 8 |

Segment C: | 14 | 10 | 11 | 12 | 13 |

WEAR LEVELING AND ACCESS METHOD AND DEVICE FOR NON-VOLATILE MEMORY, AND STORAGE MEDIUM

CROSS-REFERENCE TO RELATED APPLICATIONS

The present disclosure claims the priority to Chinese patent application CN201810802096.1, entitled "Data rotation method, device, and computer-readable storage medium" and filed with the Chinese Patent Office on Jul. 20, 2018, the entirety of which is incorporated herein by reference.

The present disclosure claims the priority to Chinese patent application CN201810824443.0, entitled "Wear leveling and access method and device for non-volatile memory, and storage medium" and filed with the Chinese Patent Office on Jul. 25, 2018, the entirety of which is incorporated herein by reference.

FIELD OF THE INVENTION

The present disclosure relates to the field of communication technologies, and in particular to a wear leveling and access method and a wear leveling and access device for a non-volatile memory, and a storage medium.

BACKGROUND OF THE INVENTION

Non-volatile memories (NVM) have experienced rapid development in recent years for having both the durability of a traditional external memory and the high performance of a traditional internal memory. Similar to solid state drives (SSD), a non-volatile memory can be erased and written only a limited number of times. This feature determines that wear leveling must be supported in a non-volatile memory. Otherwise, unintentional hotspot accesses or malicious repeated erasing attacks will cause certain physical addresses (pages, blocks, segments) to reach upper limits of erasing times first, leading to negative effects such as decrease of an available capacity in a less severe case and scrapping of an entire disk in a severe case.

A solid state drive completes wear leveling tasks by a hardware mapping table method, i.e., realizing mapping between logical addresses and physical addresses by means of a mapping table in a flash translation layer (FTL). The FTL counts access times to physical addresses, and for a physical address that is accessed at a high frequency, it is only necessary to change the mapping table by changing the physical address mapped by the logical address to a physical address that is accessed at a low frequency. In addition to address mapping and wear leveling, the FTL also undertakes tasks such as garbage collection, error correcting code (ECC) verification, bad block management, etc.

However, wear leveling for a non-volatile memory cannot just imitate the traditional hardware mapping table method for the following reasons. (1) A non-volatile memory has no FTL hardware. A FTL contains core technologies of a manufacturer of solid state drives, and it is integrated in hardware devices. A non-volatile memory, however, does not have FTL hardware. If increasing overhead and cost in hardware design only for wear leveling, it will be difficult to get support from the hardware manufacturer. (2) There are high requirements for performance of a non-volatile memory. Table lookup by means of software is inefficient, and also increases a step of "counting the number of times of erasing and writing". Such performance damage accounts for only less than 1% (basically negligible) of the solid state drive performance; however, for a non-volatile memory whose access latency is lower than a solid state drive by one to two orders of magnitude, such performance damage will produce more than 30% performance damage (very significant). (3) A non-volatile memory is rather expensive. If a mapping table is implemented and mapping relationships of "logical addresses, physical addresses, and the number of times of erasing/writing" are recorded by means of software, valuable memory space will be occupied, which greatly reduce available capacity. In summary, neither the traditional hardware mapping table method nor the software-improved mapping table method is suitable for a non-volatile memory.

In view of the above, the present disclosure proposes a wear leveling for a non-volatile memory to solve the problem of microscopic wear leveling inside the non-volatile memory.

SUMMARY OF THE INVENTION

Embodiments of the present disclosure relate to a wear leveling and access method and a wear leveling and access device for a non-volatile memory, and a storage medium, to solve the problem of microscopic wear leveling inside the non-volatile memory.

In an embodiment of the present disclosure, it is provided a wear leveling and access method for a non-volatile memory, including: logically dividing the non-volatile memory into p levels of physical units, the non-volatile memory including a plurality of $1^{st}$-level physical units, and each $(p-1)^{th}$-level physical unit including a plurality of $p^{th}$-level physical units, p being a positive integer greater than 1; and migrating, when a time cycle corresponding to $q^{th}$-level physical units arrives, data in each of the $q^{th}$-level physical units to another $q^{th}$-level physical unit, q being any positive integer from 1 to p.

In an embodiment of the present disclosure, it is provided a wear leveling and access device for a non-volatile memory, including: a non-volatile memory, a processor, a memory, and a communication bus. The communication bus is configured to realize connected communication between the processor and the memory. The processor is configured to execute a data rotation program stored in the memory to implement the following steps: logically dividing the non-volatile memory into p levels of physical units, the non-volatile memory including a plurality of $1^{st}$-level physical units, and each $(p-1)^{th}$-level physical unit including a plurality of $p^{th}$-level physical units, p being a positive integer greater than 1; and migrating, when a time cycle corresponding to $q^{th}$-level physical units arrives, data in each of the $q^{th}$-level physical units to another $q^{th}$-level physical unit, q being any positive integer from 1 to p.

In an embodiment of the present disclosure, it is provided a computer-readable storage medium storing thereon one or more programs. The one or more programs are executable by one or more processors to implement the following steps: logically dividing the non-volatile memory into p levels of physical units, wherein the non-volatile memory comprises a plurality of $1^{st}$-level physical units, and each $(p-1)^{th}$-level physical unit comprises a plurality of $p^{th}$-level physical units, p being a positive integer greater than 1; and migrating, when a time cycle corresponding to $q^{th}$-level physical units arrives, data in each of the $q^{th}$-level physical units to another $q^{th}$-level physical unit, q being any positive integer from 1 to p.

In an embodiment of the present disclosure, it is provided a wear leveling and access device for a non-volatile memory, including: the non-volatile memory and a processor. The processor is configured to execute a wear leveling and access program for the non-volatile memory to implement the following steps: logically dividing the non-volatile memory into p levels of physical units, wherein the non-volatile memory comprises a plurality of $1^{st}$-level physical units, and each $(p-1)^{th}$-level physical unit comprises a plurality of $p^{th}$-level physical units, p being a positive integer greater than 1; and migrating, when a time cycle corresponding to $q^{th}$-level physical units arrives, data in each of the $q^{th}$-level physical units to another $q^{th}$-level physical unit, q being any positive integer from 1 to p.

BRIEF DESCRIPTION OF THE DRAWINGS

FIG. 2 is a schematic diagram of a wear leveling and access method for a non-volatile memory according to an embodiment of the present disclosure;

FIG. 5 is a schematic diagram of a wear leveling and access method for a non-volatile memory according to an embodiment of the present disclosure;

Further features and advantages of the present disclosure will be further described in conjunction with the embodiments and with reference to the accompanying drawings.

DETAILED DESCRIPTION OF THE EMBODIMENTS

It should be appreciated that the specific embodiments described herein are only intended to explain rather than limiting the present disclosure.

In the following description, suffixes such as "module", "component", or "unit" used to denote elements are only used to facilitate description of the present disclosure, and they per se have no special meanings. The terms "module", "component", or "unit" can therefore be used in a mixed manner.

Figure 1:
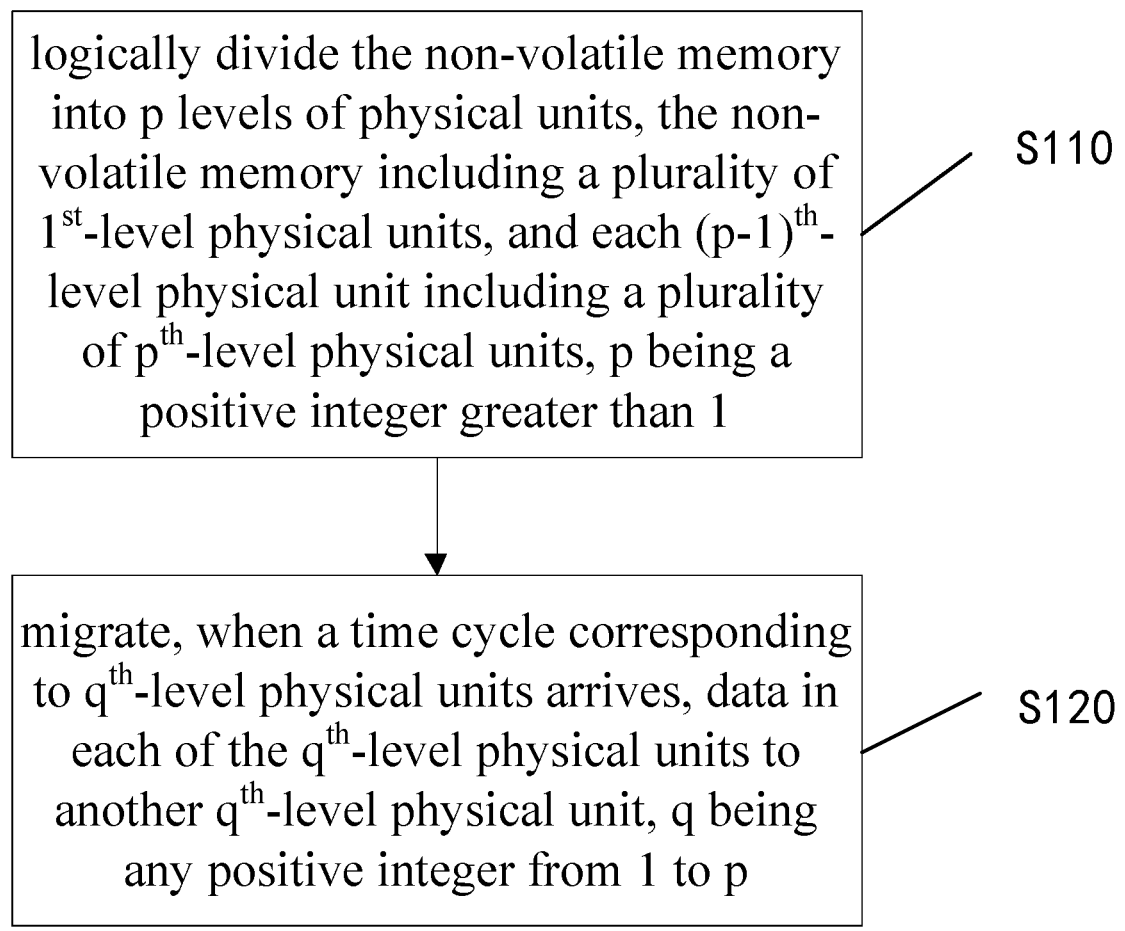
FIG. 1 is a flowchart of a wear leveling and access method for a non-volatile memory according to an embodiment of the present disclosure.

As shown in FIG. 1, an embodiment of the present disclosure provides a wear leveling and access method for a non-volatile memory, which includes the following steps.

In step S110, the non-volatile memory is logically divided into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In the present embodiment, for example, the non-volatile memory is logically divided into n first physical units each with a size of N. Each of the first physical units is divided into m second physical units each with a size of M. Each of the second physical units is divided into k third physical units each with a size of K . . . and so on.

In the present embodiment, triggering conditions for step S110 are further restricted. Examples of typical triggering conditions are: (1) manual triggering by a user; and (2) detecting, by a CPU, that in a past period of time, for example, in one hour, a number of times of writing to a fixed address in the non-volatile memory exceeded a preset threshold, for example, 100,000 times. Before step S110 is triggered, a traditional mapping table method is used.

In step S120, when a time cycle corresponding to $q^{th}$-level physical units arrives, data in each of the $q^{th}$-level physical units is migrated to another $q^{th}$-level physical unit. Q is any positive integer from 1 to p.

In the present embodiment, termination conditions for step S120 are further restricted. Examples of typical termination conditions are: (1) manually triggering by the user; (2) detecting, by the CPU, that in a past period of time, for example, in any time period such as in one hour within seven days, a number of times of writing to a fixed address in the non-volatile memory did not exceed a preset threshold, for example, 100,000 times; (3) detecting that the non-volatile memory has reached a preset service life value and is approaching an end of the service life, in which case there is no need for wear leveling; and (4) writing times for a plurality of addresses in the non-volatile memory having reached upper limits. After step S120 is terminated, the traditional mapping table method is used.

In the present embodiment, a rotation time cycle for the first physical units is set to A; a rotation time cycle for the second physical units is set to B; and a rotation time cycle for the third physical units is C . . . and so on. In the present embodiment, for example, when the time cycle A arrives, the n first physical units are rotated; when the time cycle B arrives, the m second physical units in each of the first physical units are rotated; and when the time cycle C arrives, the k third physical units in each of the second physical units are rotated . . . and so on. After the rotation, locations of the data are changed, as shown in FIG. 2.

In the present embodiment, physical units of the rotation include but are not limited to: (1) segment; (2) block; (3) page; (4) bytes (B); (5) kilobytes (KB); (6) megabytes (MB); (7) gigabytes (GB); (8) and other memory capacity units. Time units of the rotation include but are not limited to: (1) years; (2) quarters; (3) months; (4) weeks; (5) days; (6) hours; (7) minutes; (8) seconds; (9) and other lunar and Tibetan calendar time units. Modes of the rotation include but are not limited to: (1) one-by-one rotation in sequence; (2) one-by-one rotation in an inverted sequence; (3) jumping rotation in sequence; (4) jumping rotation in an inverted sequence; (5) pseudo-random rotation; and (6) other rotation modes.

According to the present embodiment, unintentional or centralized malicious accesses to a same fixed logical address can be actually evenly distributed to various physical addresses, to thereby achieve a wear leveling effect. Compared with the traditional mapping table method, the method of the present disclosure completes conversion between logical addresses and physical addresses through simple calculation without long-time occupying of additional memory space, and avoids inefficient table lookup operations, by way of which space and time are saved.

Figure 3:
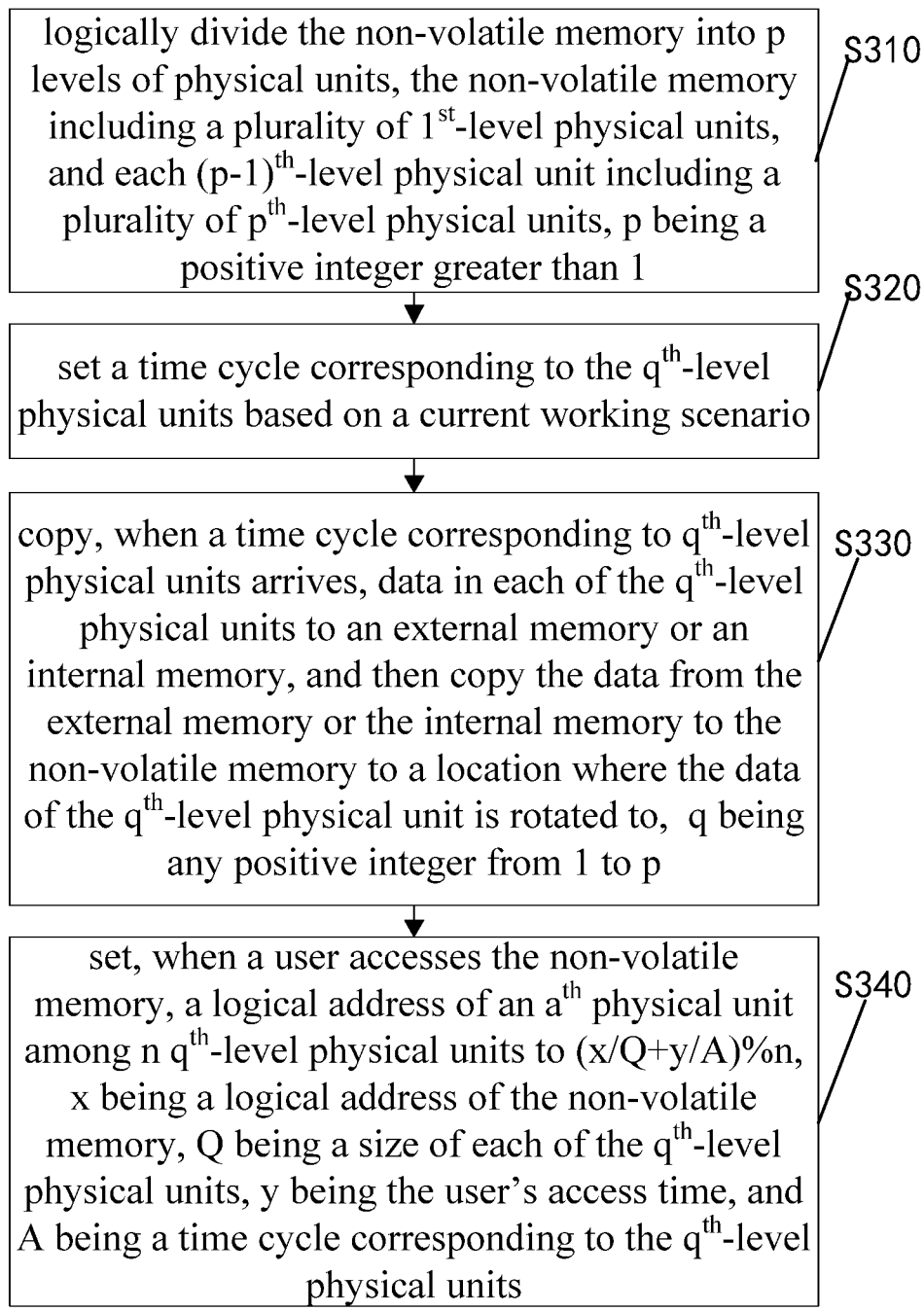
FIG. 3 is a flowchart of a wear leveling and access method for a non-volatile memory according to an embodiment of the present disclosure.

As shown in FIG. 3, an embodiment of the present disclosure provides a wear leveling and access method for a non-volatile memory, which includes the following steps.

In step S310, the non-volatile memory is logically divided into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In step S320, a time cycle corresponding to $q^{th}$-level physical units is set based on a current working scenario.

In the present embodiment, physical units to be rotated are rotated independently and simultaneously. Of course, rotation of segments only or rotation of blocks only can realize a wear leveling effect to some extent, but fixedly distributing accesses to a same logical address to a few physical addresses cannot lead to distribution of the logical address to all physical addresses. The present disclosure needs to protect all steps or combinations of the steps. The shorter a rotation interval is, the stronger a wear leveling effect is, and the more frequent the migration of data is, which will temporarily interrupt external services. Therefore, the rotation interval cannot be too long or too short, and needs to be determined as practically required when use cases are implemented. In an embodiment, a migration time should be during a low-load period of the system. In an embodiment, when the system is under attack, or in other scenarios where there is a need, the time cycles A, B, and C may be shortened and triggered by the user or automatically triggered by the system.

In step S330, when a time cycle corresponding to $q^{th}$-level physical units arrives, data in each of the $q^{th}$-level physical units is copied to an external memory or an internal memory, and then copied from the external memory or the internal memory to the non-volatile memory to a location where the data of the $q^{th}$-level physical unit is rotated to q is any positive integer from 1 to p.

In the present embodiment, another rotation mode is also provided. Specifically, data in a $q^{th}$-level physical unit is copied to an external memory or an internal memory; data in each of other $q^{th}$-level physical units is copied one by one to a location of last copied data in the non-volatile memory; and then the data in the external memory or the internal memory is copied to a location of a last copied data in the non-volatile memory.

In the present embodiment, (1) all data in the non-volatile memory is copied to another internal memory or external memory, and then the data is copied to the non-volatile memory to new locations; and (2) a last segment (or block) in the non-volatile memory is copied to another internal memory or external memory, and then other data in the non-volatile memory is copied segment (block) by segment (block) to new locations, and finally the last segment (or block) temporarily stored in said internal memory or external memory is copied to a new location in the non-volatile memory.

In step S340, when the user accesses the non-volatile memory, a logical address of an $a^{th}$ physical unit among n $q^{th}$-level physical units is set to $(x/Q+y/A)\ \%\ n$, where x is a logical address of the non-volatile memory; Q is a size of each of the $q^{th}$-level physical units; y is the user's access time; and A is the time cycle corresponding to the $q^{th}$-level physical units.

In the present embodiment, for example, when the user accesses a memory with a logical address x at time y, a physical address Z of the memory is calculated by this method. In an $a^{th}$ first physical unit, $Z=(x/N+y/A)\ \%\ n$ is calculated; in a $b^{th}$ second physical unit, $Z=(x/M+y/B)\ \%\ m$ is calculated; in a $c^{th}$ third physical unit, $Z=(x/K+y/C)\ \%\ k$ is calculated . . . and so on. The physical address Z can be determined through the a, b, c. . . . The above access method may be performed by the user or not by the user. In case of the former, the user performs the above steps, and converts a logical address into a physical address first when accessing. In case of the latter, rotation of a physical address is transparent to the user, and the user always accesses a logical address only during the accessing, and the logical address is converted to a physical address by a driver (or an operating system, or a container).

According to the present embodiment, unintentional or malicious centralized accesses to a same fixed logical address can be actually evenly distributed to various physical addresses, to thereby achieve a wear leveling effect. Compared with the traditional mapping table method, the method of the present disclosure completes conversion between logical addresses and physical addresses through simple calculation without additional long-time occupying of memory space, and avoids inefficient table lookup operations, by way of which space and time are saved.

Figure 4:
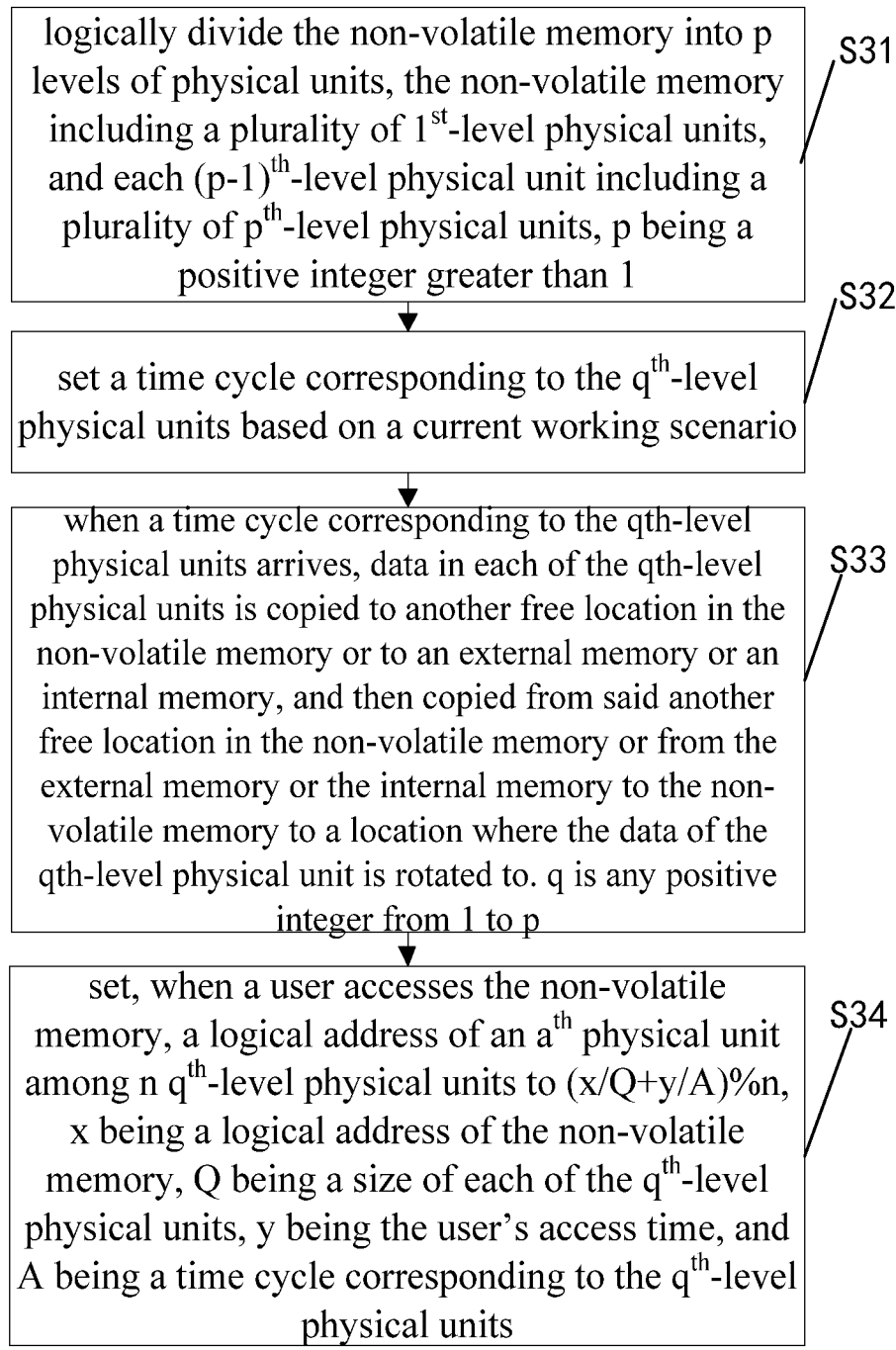
FIG. 4 is a flowchart of a wear leveling and access method for a non-volatile memory according to another embodiment of the present disclosure.

As shown in FIG. 4, an embodiment of the present disclosure provides a wear leveling and access method for a non-volatile memory, which includes the following steps.

In step S31, the non-volatile memory is logically divided into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In step S32, a time cycle corresponding to $q^{th}$-level physical units is set based on a current working scenario.

In the present embodiment, physical units to be rotated are rotated independently and simultaneously. Of course, rotation of segments only or rotation of blocks only can realize a wear leveling effect to some extent, but fixedly distributing accesses to a same logical address to a few physical addresses cannot lead to distribution of the logical address to all physical addresses. The present disclosure needs to protect all steps or combinations of some of the steps. The shorter a rotation interval is, the stronger a wear leveling effect is, and the more frequent the migration of data is, which will temporarily interrupt external services. Therefore, the rotation interval cannot be too long or too short, and needs to be determined as practically required when use cases are implemented. In an embodiment, a migration time should be during a low-load period of the system. In an embodiment, when the system is under attack, or in other scenarios where there is a need, the time cycles A, B, and C may be shortened and triggered by the user or automatically triggered by the system.

In step S33, when a time cycle corresponding to the $q^{th}$-level physical units arrives, data in each of the $q^{th}$-level physical units is copied to another free location in the non-volatile memory or to an external memory or an internal memory, and then copied from said another free location in the non-volatile memory or from the external memory or the internal memory to the non-volatile memory to a location where the data of the $q^{th}$-level physical unit is rotated to q is any positive integer from 1 to p.

In the present embodiment, another rotation mode is also provided: data in a $q^{th}$-level physical unit is copied to another free location in the non-volatile memory or to an external memory or an internal memory; data in each of other $q^{th}$-level physical units is copied one by one to a location of last copied data in the non-volatile memory; and then the data at said another free location in the non-volatile memory or in the external memory or the internal memory is copied to a location of a last copied data in the non-volatile memory.

In the present embodiment, (1) all data in the non-volatile memory is copied to another internal memory or external memory, and then the data is copied to the non-volatile memory according to new locations; and (2) a last segment (or block) in the non-volatile memory is copied to another internal memory or external memory, and then other data in the non-volatile memory is copied segment (block) by segment (block) to new locations, and finally the last segment (or block) temporarily stored in said internal memory or external memory is copied to a new location in the non-volatile memory.

In step S34, when the user accesses the non-volatile memory, a logical address of an $a^{th}$ physical unit among n $q^{th}$-level physical units is set to (x/Q+y/A) % n, where x is a logical address of the non-volatile memory; Q is a size of each of the $q^{th}$-level physical units; y is the user's access time; and A is the time cycle corresponding to the $q^{th}$-level physical units.

In the present embodiment, for example, when the user accesses a memory with a logical address x at time y, a physical address Z of the memory is calculated by this method. In an $a^{th}$ first physical unit, Z=(x/N+y/A) % n is calculated; in a $b^{th}$ second physical unit, Z=(x/M+y/B) % m is calculated; in a $c^{th}$ third physical unit, Z=(x/K+y/C) % k is calculated . . . and so on. The physical address Z can be determined through the a, b, c. . . . The above access method may be performed by the user or not by the user. In case of the former, the user performs the above steps, and converts a logical address into a physical address first when accessing. In case of the latter, rotation of a physical address is transparent to the user, and the user always accesses a logical address only during the accessing, and the logical address is converted to a physical address by a driver (or an operating system, or a container).

According to the present embodiment, unintentional or malicious centralized accesses to a same fixed logical address can be actually evenly distributed to various physical addresses, to thereby achieve a wear leveling effect. Compared with the traditional mapping table method, the method of the present disclosure completes conversion between logical addresses and physical addresses through simple calculation without additional long-time occupying of memory space, and avoids inefficient table lookup operations, by way of which space and time are saved.

Figure 5:
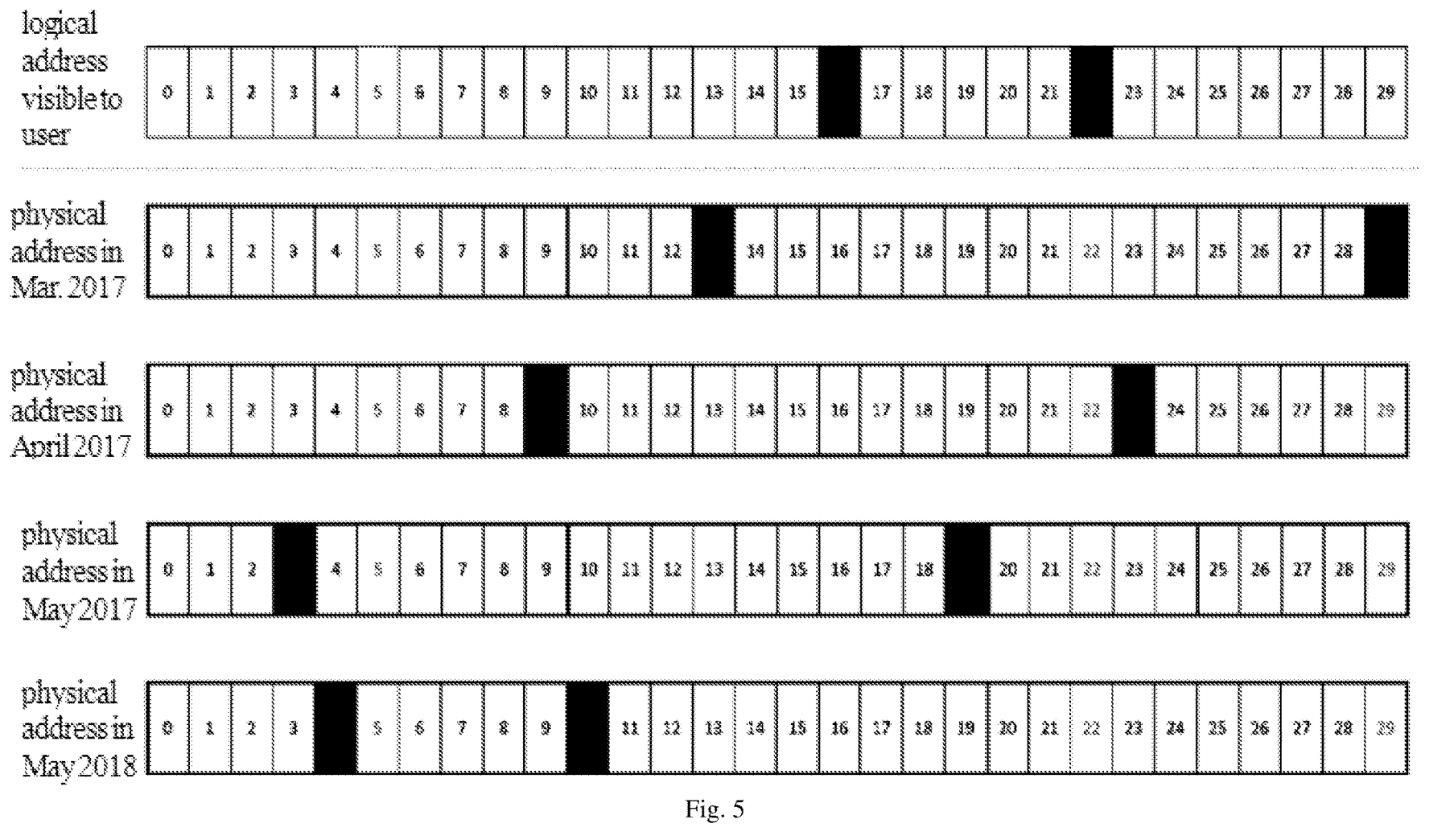

FIG. 5 shows a specific example of the present embodiment.

(1) The rotation cycle A is a month. The rotation cycle B is a year. The non-volatile memory is logically divided into three segments, each segment having ten blocks. The mode of rotation is one-by-one rotation in sequence.

(2) In a last second of each month, the three segments in the non-volatile memory are rotated. That is, contents in a $3^{rd}$ segment are temporarily written to another internal memory; contents in a $2^{nd}$ segment are written to a location of the $3^{rd}$ segment 3; contents in a $1^{st}$ segment are written to a location of the $2^{nd}$ segment; and the contents temporarily stored in said another internal memory are written to a location of the $1^{st}$ segment.

(3) In a last second of each year, blocks in the three segments in the non-volatile memory are rotated one by one. Specifically, contents in a $1^{st}$ block are written to a location of a $2^{nd}$ block; contents in the $2^{nd}$ block are written to a location of a $3^{rd}$ block . . . and so on.

(4) The following steps show conversion of a logical address to a physical address at a specific time.

(5) In March 2017, a logical address that the user accessed is a $16^{th}$ block, which was a $7^{th}$ block in the $2^{nd}$ segment. Because it is March, the segment is shifted backwards three times in its serial number, and the segment after the shift is still the $2^{nd}$ segment. Because it is 2017, the block is shifted backwards two thousand and seventeen times in its serial number, and the block after the shift is a $4^{th}$ block in the segment. In summary, a physical address of this block is the $4^{th}$ block in the $2^{nd}$ segment, namely a $13^{th}$ block.

(6) In April 2017, a logical address that the user accessed is still the $16^{th}$ block. Because it is April, the segment is circularly shifted backwards four times in its serial number, and the segment after the shift is the $3^{rd}$ segment. Because it is 2017, the block is shifted backwards two thousand and seventeen times in its serial number, and the block after the shift is a $4^{th}$ block in the segment. In summary, a physical address of this block is the $4^{th}$ block in the $3^{rd}$ segment, namely a $23^{rd}$ block.

(7) In May 2017, a logical address that the user accessed is still the $16^{th}$ block. Because it is May, the segment is circularly shifted backward five times in its serial number, and the segment after the shift is the $1^{st}$ segment. Because it is 2017, the block is shifted backwards two thousand and seventeen times in its serial number, and the block after the shift is a $4^{th}$ block in the segment. In summary, a physical address of this block is the $4^{th}$ block in the $1^{st}$ segment, namely a $3^{rd}$ block.

(8) In May 2018, a logical address that the user accessed is still the $16^{th}$ block. Because it is May, the segment is circularly shifted backward five times in its serial number, and the segment after the shift is the $1^{st}$ segment. Because it is 2018, the block is shifted backwards two thousand and eighteen times in its serial number, and the block after the shift is a $5^{th}$ block in the segment. In summary, a physical address of this block is the $5^{th}$ block in the Pt segment, namely a $4^{rd}$ block.

(9) Similarly, for a block with a logical address of 22, its physical address in March 2017 was a $29^{th}$ block; its physical address in April 2017 was a $9^{th}$ block; its physical address in May 2017 was a $19^{th}$ block; and its physical address in June 2018 was a $10^{th}$ block.

Figure 6:
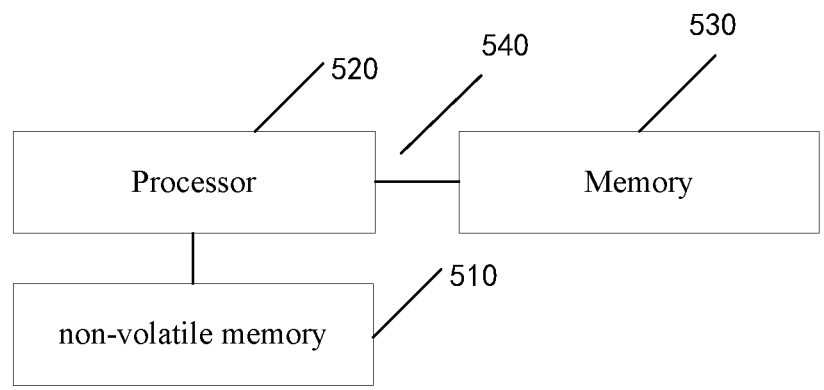
FIG. 6 is a block diagram of a wear leveling and access device for a non-volatile memory according to an embodiment of the present disclosure.

As shown in FIG. 6, an embodiment of the present disclosure provides a data rotation device, including a non-volatile memory 510, a processor 520, a memory 530, and a communication bus 540. The communication bus 540 is configured to realize connected communication between the processor 520 and the memory 530. The processor 520 is configured to execute a data rotation program stored in the memory 530 so as to implement the following steps.

The non-volatile memory is logically divided into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In the present embodiment, for example, the non-volatile memory is logically divided into n first physical units each with a size of N. Each of the first physical units is divided into m second physical units each with a size of M. Each of the second physical units is divided into k third physical units each with a size of K . . . and so on.

When a time cycle corresponding to $q^{th}$-level physical units arrives, data in each of the $q^{th}$-level physical units is migrated to another $q^{th}$-level physical unit. Q is any positive integer from 1 to p.

In the present embodiment, a rotation time cycle for the first physical units is set to A; a rotation time cycle for the second physical units is set to B; and a rotation time cycle for the third physical units is C . . . and so on. In the present embodiment, for example, when the time cycle A arrives, the n first physical units are rotated; when the time cycle B arrives, the m second physical units in each of the first physical units are rotated; and when the time cycle C arrives, the k third physical units in each of the second physical units are rotated . . . and so on. After the rotation, locations of the data are changed, as shown in FIG. 2.

In the present embodiment, physical units of the rotation include but are not limited to: (1) segment; (2) block; (3) page; (4) bytes (B); (5) kilobytes (KB); (6) megabytes (MB); (7) gigabytes (GB); (8) and other memory capacity units. Time units of the rotation include but are not limited to: (1) years; (2) quarters; (3) months; (4) weeks; (5) days; (6) hours; (7) minutes; (8) seconds; (9) and other lunar and Tibetan calendar time units. Modes of the rotation include but are not limited to: (1) one-by-one rotation in sequence; (2) one-by-one rotation in an inverted sequence; (3) jumping rotation in sequence; (4) jumping rotation in an inverted sequence; (5) pseudo-random rotation; and (6) other rotation modes.

According to the present embodiment, unintentional or malicious accesses to a same fixed logical address can be actually evenly distributed to various physical addresses, thereby achieving a wear leveling effect. Compared with the traditional mapping table method, the method of the present disclosure completes conversion of logical addresses and physical addresses through simple calculation without additional long-time occupying of memory space, and avoids inefficient table lookup operations, by way of which space and time are saved.

As shown in FIG. 6, an embodiment of the present disclosure provides a data rotation device, including a non-volatile memory 510, a processor 520, a memory 530, and a communication bus 540. The communication bus 540 is configured to realize connected communication between the processor 520 and the memory 530. The processor 520 is configured to execute a data rotation program stored in the memory 530 so as to implement the following step: logically dividing the non-volatile memory into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

A time cycle corresponding to $q^{th}$-level physical units is set based on a current working scenario.

In the present embodiment, physical units to be rotated are rotated independently and simultaneously. Of course, rotation of segments only or rotation of blocks only can realize a wear leveling effect to some extent, but fixedly distributing accesses to a same logical address to a few physical addresses cannot lead to distribution of the logical address to all physical addresses. The present disclosure needs to protect all steps or combinations of some of the steps. The shorter a rotation interval is, the stronger a wear leveling effect is, and the more frequent the migration of data is, which will temporarily interrupt external services. Therefore, the rotation interval cannot be too long or too short, and needs to be determined as practically required when use cases are implemented. In an embodiment, a migration time should be during a low-load period of the system. In an embodiment, when the system is under attack, or in other scenarios where there is a need, the time cycles A, B, and C may be shortened and triggered by the user or automatically triggered by the system.

When a time cycle corresponding to $q^{th}$-level physical units arrives, data in each of the $q^{th}$-level physical units is copied to an external storage or an internal memory, and then copied from the external memory or the internal memory to the non-volatile memory to a location where the data of the $q^{th}$-level physical unit is rotated to q is any positive integer from 1 to p.

In the present embodiment, another rotation mode is also provided. Specifically, data in a $q^{th}$-level physical unit is copied to an external memory or an internal memory; data in each of other $q^{th}$-level physical units is copied one by one to a location of last copied data in the non-volatile memory; and then the data in the external memory or the internal memory is copied to a location of a last copied data in the non-volatile memory.

In the present embodiment, (1) all data in the non-volatile memory is copied to another internal memory or external memory, and then the data is copied to the non-volatile memory to new locations; and (2) a last segment (or block) in the non-volatile memory is copied to another internal memory or external memory, and then other data in the non-volatile memory is copied segment (block) by segment (block) to new locations, and finally the last segment (or block) temporarily stored in said internal memory or external memory is copied to a new location in the non-volatile memory.

When the user accesses the non-volatile memory, a logical address of an $a^{th}$ physical unit among n $q^{th}$-level physical units is set to $(x/Q+y/A)$ % n, where x is a logical address of the non-volatile memory; Q is a size of each of the $q^{th}$-level physical units; y is the user's access time; and A is the time cycle corresponding to the $q^{th}$-level physical units.

In the present embodiment, for example, when the user accesses a memory with a logical address x at time y, a physical address Z of the memory is calculated by this method. In an $a^{th}$ first physical unit, $Z=(x/N+y/A)$ % n is calculated; in a $b^{th}$ second physical unit, $Z=(x/M+y/B)$ % m is calculated; in a $c^{th}$ third physical unit, $Z=(x/K+y/C)$ % k is calculated . . . and so on. The physical address Z can be determined through the a, b, c. . . . The above access method may be performed by the user or not by the user. In case of the former, the user performs the above steps, and converts a logical address into a physical address first when accessing. In case of the latter, rotation of a physical address is transparent to the user, and the user always accesses a logical address only during the accessing, and the logical address is converted to a physical address by a driver (or an operating system, or a container).

According to the present embodiment, unintentional or malicious centralized accesses to a same fixed logical address can be actually evenly distributed to various physical addresses, to thereby achieve a wear leveling effect. Compared with the traditional mapping table method, the method of the present disclosure completes conversion between logical addresses and physical addresses through simple calculation without long-time occupying of additional memory space, and avoids inefficient table lookup operations, by way of which space and time are saved.

Figure 7:
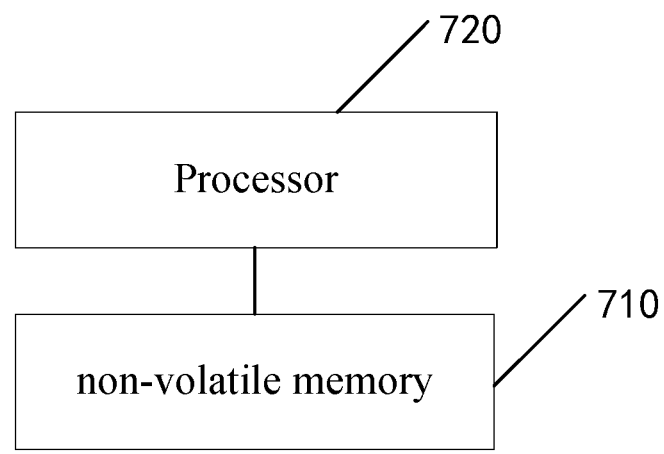
FIG. 7 is a block diagram of a wear leveling and access device for a non-volatile memory according to another embodiment of the present disclosure.

As shown in FIG. 7, an embodiment of the present disclosure provides a wear leveling and access device for a non-volatile memory, including a non-volatile memory 710 and a processor 720.

The processor 720 is configured to execute a wear leveling and access program for the non-volatile memory to implement the following step: logically dividing the non-volatile memory into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In the present embodiment, for example, the non-volatile memory is logically divided into n first physical units each with a size of N. Each of the first physical units is divided into m second physical units each with a size of M. Each of the second physical units is divided into k third physical units each with a size of K . . . and so on.

When a time cycle corresponding to $q^{th}$-level physical units arrives, data in each of the $q^{th}$-level physical units is migrated to another $q^{th}$-level physical unit. Q is any positive integer from 1 to p.

In the present embodiment, a rotation time cycle for the first physical units is set to A; a rotation time cycle for the second physical units is set to B; and a rotation time cycle for the third physical units is C . . . and so on. In the present embodiment, for example, when the time cycle A arrives, the n first physical units are rotated; when the time cycle B arrives, the m second physical units in each of the first physical units are rotated; and when the time cycle C arrives, the k third physical units in each of the second physical units are rotated . . . and so on. After the rotation, locations of the data are changed, as shown in FIG. 2.

In the present embodiment, physical units of the rotation include but are not limited to: (1) segment; (2) block; (3) page; (4) bytes (B); (5) kilobytes (KB); (6) megabytes (MB); (7) gigabytes (GB); (8) and other memory capacity units. Time units of the rotation include but are not limited to: (1) years; (2) quarters; (3) months; (4) weeks; (5) days; (6) hours; (7) minutes; (8) seconds; (9) and other lunar and Tibetan calendar time units. Modes of the rotation include but are not limited to: (1) one-by-one rotation in sequence; (2) one-by-one rotation in an inverted sequence; (3) jumping rotation in sequence; (4) jumping rotation in an inverted sequence; (5) pseudo-random rotation; and (6) other rotation modes.

According to the present embodiment, unintentional or malicious accesses to a same fixed logical address can be actually evenly distributed to various physical addresses, thereby achieving a wear leveling effect. Compared with the traditional mapping table method, the method of the present disclosure completes conversion of logical addresses and physical addresses through simple calculation without additional long-time occupying of memory space, and avoids inefficient table lookup operations, by way of which space and time are saved.

As shown in FIG. 7, an embodiment of the present disclosure provides a wear leveling and access device for a non-volatile memory, including a non-volatile memory 710 and a processor 720.

The processor 720 is configured to execute a wear leveling and access program for the non-volatile memory to implement the following step: logically dividing the non-volatile memory into p levels of physical units. The non-volatile memory includes a plurality of 1$^{st}$-level physical units, and each (p−1)$^{th}$-level physical unit includes a plurality of p$^{th}$-level physical units. P is a positive integer greater than 1.

A time cycle corresponding to $q^{th}$-level physical units is set based on a current working scenario.

In the present embodiment, physical units to be rotated are rotated independently and simultaneously. Of course, rotation of segments only or rotation of blocks only can realize a wear leveling effect to some extent, but fixedly distributing accesses to a same logical address to a few physical addresses cannot lead to distribution of the logical address to all physical addresses. The present disclosure needs to protect all steps or combinations of some of the steps. The shorter a rotation interval is, the stronger a wear leveling effect is, and the more frequent the migration of data is, which will temporarily interrupt external services. Therefore, the rotation interval cannot be too long or too short, and needs to be determined as practically required when use cases are implemented. In an embodiment, a migration time should be during a low-load period of the system. In an embodiment, when the system is under attack, or in other scenarios where there is a need, the time cycles A, B, and C may be shortened and triggered by the user or automatically triggered by the system.

When a time cycle corresponding to the $q^{th}$-level physical units arrives, data in each of the $q^{th}$-level physical units is copied to another free location in the non-volatile memory or to an external memory or an internal memory, and then copied from said another free location in the non-volatile memory or from the external memory or the internal memory to the non-volatile memory to a location where the data of the $q^{th}$-level physical unit is rotated to q is any positive integer from 1 to p.

In the present embodiment, another rotation mode is also provided: data in a $q^{th}$-level physical unit is copied to another free location in the non-volatile memory or to an external memory or an internal memory; data in each of other $q^{th}$-level physical units is copied one by one to a location of last copied data in the non-volatile memory; and then the data in said another free location in the non-volatile memory or in the external memory or the internal memory is copied to a location of a last copied data in the non-volatile memory.

In the present embodiment, (1) all data in the non-volatile memory is copied to another internal memory or external memory, and then the data is copied to the non-volatile memory to new locations; and (2) a last segment (or block) in the non-volatile memory is copied to another internal memory or external memory, and then other data in the non-volatile memory is copied segment (block) by segment (block) to new locations, and finally the last segment (or block) temporarily stored in said internal memory or external memory is copied to a new location in the non-volatile memory.

When the user accesses the non-volatile memory, a logical address of an $a^{th}$ physical unit among n $q^{th}$-level physical units is set to (x/Q+y/A) % n, where x is a logical address of the non-volatile memory; Q is a size of each of the $q^{th}$-level physical units; y is the user's access time; and A is the time cycle corresponding to the $q^{th}$-level physical units.

In the present embodiment, for example, when the user accesses a memory with a logical address x at time y, a physical address Z of the memory is calculated by this method. In an $a^{th}$ first physical unit, Z=(x/N+y/A) % n is calculated; in a $b^{th}$ second physical unit, Z=(x/M+y/B) % m is calculated; in a $c^{th}$ third physical unit, Z=(x/K+y/C) % k is calculated . . . and so on. The physical address can be determined through the Z a, b, c. . . . The above access method may be performed by the user or not by the user. In case of the former, the user performs the above steps, and converts a logical address into a physical address first when accessing. In case of the latter, rotation of a physical address is transparent to the user, and the user always accesses a logical address only during the accessing, and the logical address is converted to a physical address by a driver (or an operating system, or a container).

According to the present embodiment, unintentional or malicious centralized accesses to a same fixed logical address can be actually evenly distributed to various physical addresses, to thereby achieve a wear leveling effect. Compared with the traditional mapping table method, the method of the present disclosure completes conversion between logical addresses and physical addresses through simple calculation without additional long-time occupying of memory space, and avoids inefficient table lookup operations, by way of which space and time are saved.

FIG. 5 shows a specific example of the present embodiment.

(1) The rotation cycle A is a month. The rotation cycle B is a year. The non-volatile memory is logically divided into three segments, each segment having ten blocks. The mode of rotation is one-by-one rotation in sequence.

(2) In a last second of each month, the three segments in the non-volatile memory are rotated. That is, contents in a $3^{rd}$ segment are temporarily written to another internal memory; contents in a $2^{nd}$ segment are written to a location of the $3^{rd}$ segment 3; contents in a $1^{st}$ segment are written to a location of the $2^{nd}$ segment; and the contents temporarily stored in said another internal memory are written to a location of the Pt segment.

(3) In a last second of each year, blocks in the three segments in the non-volatile memory are rotated one by one. Specifically, contents in a $1^{st}$ block are written to a location of a $2^{nd}$ block; contents in the $2^{nd}$ block are written to a location of a $3^{rd}$ block . . . and so on.

(4) The following steps show conversion of a logical address to a physical address at a specific time.

(5) In March 2017, a logical address that the user accessed is a $16^{th}$ block, which was a $7^{th}$ block in the $2^{nd}$ segment. Because it is March, the segment is shifted backwards three times in its serial number, and the segment after the shift is still the $2^{nd}$ segment. Because it is 2017, the block is shifted backwards two thousand and seventeen times in its serial number, and the block after the shift is a $4^{th}$ block in the segment. In summary, a physical address of this block is the $4^{th}$ block in the $2^{nd}$ segment, namely a $13^{th}$ block.

(6) In April 2017, a logical address that the user accessed is still the $16^{th}$ block. Because it is April, the segment is circularly shifted backwards four times in its serial number, and the segment after the shift is the $3^{rd}$ segment. Because it is 2017, the block is shifted backwards two thousand and seventeen times in its serial number, and the block after the shift is a $4^{th}$ block in the segment. In summary, a physical address of this block is the $4^{th}$ block in the $3^{rd}$ segment, namely a $23^{rd}$ block.

(7) In May 2017, a logical address that the user accessed is still the $16^{th}$ block. Because it is May, the segment is circularly shifted backward five times in its serial number, and the segment after the shift is the $1^{st}$ segment. Because it is 2017, the block is shifted backwards two thousand and seventeen times in its serial number, and the block after the shift is a $4^{th}$ block in the segment. In summary, a physical address of this block is the $4^{th}$ block in the $1^{st}$ segment, namely a $3^{rd}$ block.

(8) In May 2018, a logical address that the user accessed is still the $16^{th}$ block. Because it is May, the segment is circularly shifted backward five times in its serial number, and the segment after the shift is the $1^{st}$ segment. Because it is 2018, the block is shifted backwards two thousand and eighteen times in its serial number, and the block after the shift is a $5^{th}$ block in the segment. In summary, a physical address of this block is the $5^{th}$ block in the $1^{st}$ segment, namely a $4^{rd}$ block.

(9) Similarly, for an accessed logical address which was a $22^{nd}$ block, its physical address in March 2017 was a $29^{th}$ block; its physical address in April 2017 was a $9^{th}$ block; its physical address in May 2017 was a $19^{th}$ block; and its physical address in June 2018 was a $10^{th}$ block. An embodiment of the present disclosure provides a computer-readable storage medium storing thereon one or more programs. The one or more programs can be executed by one or more processors to implement the following step: logically dividing the non-volatile memory into p levels of physical units. The non-volatile memory includes a plurality of $1^{st}$-level physical units, and each $(p-1)^{th}$-level physical unit includes a plurality of $p^{th}$-level physical units. P is a positive integer greater than 1.

In the present embodiment, for example, the non-volatile memory is logically divided into n first physical units each with a size of N. Each of the first physical units is divided into m second physical units each with a size of M. Each of the second physical units is divided into k third physical units each with a size of K . . . and so on.

When a time cycle corresponding to $q^{th}$-level physical units arrives, data in each of the $q^{th}$-level physical units is migrated to another $q^{th}$-level physical unit. Q is any positive integer from 1 to p.

In the present embodiment, a rotation time cycle for the first physical units is set to A; a rotation time cycle for the second physical units is set to B; and a rotation time cycle for the third physical units is C . . . and so on. In the present embodiment, for example, when the time cycle A arrives, the n first physical units are rotated; when the time cycle B arrives, the m second physical units in each of the first physical units are rotated; and when the time cycle C arrives, the k third physical units in each of the second physical units are rotated . . . and so on. After the rotation, locations of the data are changed, as shown in FIG. 2.

In the present embodiment, physical units of the rotation include but are not limited to: (1) segment; (2) block; (3) page; (4) bytes (B); (5) kilobytes (KB); (6) megabytes (MB); (7) gigabytes (GB); (8) and other memory capacity units. Time units of the rotation include but are not limited to: (1) years; (2) quarters; (3) months; (4) weeks; (5) days; (6) hours; (7) minutes; (8) seconds; (9) and other lunar and Tibetan calendar time units. Modes of the rotation include but are not limited to: (1) one-by-one rotation in sequence; (2) one-by-one rotation in an inverted sequence; (3) jumping rotation in sequence; (4) jumping rotation in an inverted sequence; (5) pseudo-random rotation; and (6) other rotation modes.

According to the present embodiment, unintentional or malicious accesses to a same fixed logical address can be actually evenly distributed to various physical addresses, thereby achieving a wear leveling effect. Compared with the traditional mapping table method, the method of the present disclosure completes conversion of logical addresses and physical addresses through simple calculation without additional long-time occupying of memory space, and avoids inefficient table lookup operations, by way of which space and time are saved.

It should be appreciated that all or some of the steps of the methods, and the functional modules/units of the systems and devices disclosed above, may be implemented as software, firmware, hardware, and any suitable combinations thereof. In hardware implementations, the division between functional modules/units referred to in the above description does not necessarily correspond to the division between physical components. For example, one physical component may have multiple functions, or one function or step may be executed by a combination of a plurality of physical components. Some or all of the components may be implemented as software executed by a processor, such as a CPU, a digital signal processor or a microprocessor, or be implemented as hardware, or as an integrated circuit, such as an application-specific integrated circuit. Such software may be distributed on a computer-readable medium which may include computer storage medium (or non-transitory medium) and communication medium (or transitory medium). It should be appreciated that the term computer storage medium includes volatile and non-volatile, removable and non-removable medium implemented in any method or technology for storage of information (such as computer-readable instructions, data structures, program modules, or other data). Computer storage medium includes, but is not limited to, RAM, ROM, EEPROM, flash memory or other memory technologies, CD-ROM, digital versatile disk (DVD) or other optical disk storages, magnetic cassettes, magnetic tapes, magnetic disk storages or other magnetic storages, or any other medium that can be used to store desired information and can be accessed by a computer. In addition, it should be appreciated that communication medium typically contains computer-readable instructions, data structures, program modules or other data in a modulated data signal such as a carrier wave or other transport mechanism, and may include any information delivery medium.

The above describes embodiments of the present disclosure with reference to the accompanying drawings, but the present disclosure is not limited to the above described specific embodiments. The above specific embodiments are only illustrative rather than restrictive. Those of ordinary skill in the art, with the teachings of the present disclosure, may make many variations without departing from the spirit of the present disclosure and the protection scope of the claims, and all such variations should be within the protection scope of the present disclosure.

What is claimed is:

1. A wear leveling and access method for a non-volatile memory, comprising:
   logically dividing the non-volatile memory into p levels of physical units, wherein the non-volatile memory comprises a plurality of 1st-level physical units, and each (p-1)th-level physical unit comprises a plurality of $p^{th}$-level physical units, p being a positive integer greater than 1;
   migrating, when a time cycle corresponding to $q^{th}$-level physical units arrives, data in each of the $q^{th}$-level physical units to another $q^{th}$-level physical unit, q being any positive integer from 1 to p; and
   setting, when a user accesses the non-volatile memory, a logical address of an $a^{th}$ physical unit among n $q^{th}$-level physical units to (x/Q+y/A) % n, wherein x is a logical address of the non-volatile memory, Q is a size of each of the $q^{th}$-level physical units, y is the user's access time, and A is a time cycle corresponding to the $q^{th}$-level physical units.

2. The method according to claim 1, wherein migrating data in each of the $q^{th}$-level physical units to another $q^{th}$-level physical unit comprises:
   copying data in each of the $q^{th}$-level physical units to an external memory or an internal memory, and then copying the data from the external memory or the internal memory to the non-volatile memory to a location where the data of the $q^{th}$-level physical unit is rotated to.

3. The method according to claim 1, wherein migrating data in each of the $q^{th}$ level physical units to another $q^{th}$-level physical unit comprises:
   copying data in each of the $q^{th}$-level physical units to a free location in the non-volatile memory or to an external memory or an internal memory, and then copying the data from the free location in the non-volatile memory or from the external memory or the internal memory to the non-volatile memory to a location where the data of the $q^{th}$-level physical unit is rotated to.

4. The method according to claim 1, wherein migrating data in each of the $q^{th}$-level physical units to another $q^{th}$-level physical unit comprises:
   copying data in a $q^{th}$-level physical unit to an external memory or an internal memory, copying data in each of other $q^{th}$-level physical units one by one to a location of last copied data in the non-volatile memory, and then copying the data in the external memory or the internal memory to a location of a last copied data in the non-volatile memory.

5. The method according to claim 1, wherein migrating data in each of the $q^{th}$-level physical units to another $q^{th}$-level physical unit comprises:
   copying data in a $q^{th}$-level physical unit to a free location in the non-volatile memory or to an external memory or an internal memory, copying data in each of other $q^{th}$-level physical units one by one to a location of last copied data in the non-volatile memory, and then copying the data at the free location in the non-volatile memory or in the external memory or the internal memory to a location of a last copied data in the non-volatile memory.

6. The method according to claim 1, wherein before migrating data in each of the $q^{th}$-level physical units to another $q^{th}$-level physical unit, the method further comprises:
   setting a time cycle corresponding to the $q^{th}$-level physical units based on a current working scenario.

7. A wear leveling and access device for a non-volatile memory, comprising: a non-volatile memory, a processor, a memory, and a communication bus, wherein:
   the communication bus is configured to realize connected communication between the processor and the memory; and
   the processor is configured to execute a data rotation program stored in the memory so as to implement the following steps:
   logically dividing the non-volatile memory into p levels of physical units, wherein the non-volatile memory comprises a plurality of 1st-level physical units, and each $(p-1)^{th}$-level physical unit comprises a plurality of $p^{th}$-level physical units, p being a positive integer greater than 1;
   migrating, when a time cycle corresponding to $q^{th}$-level physical units arrives, data in each of the $q^{th}$-level physical units to another $q^{th}$-level physical unit, q being any positive integer from 1 to p; and
   setting, when a user accesses the non-volatile memory, a logical address of an $a^{th}$ physical unit among n $q^{th}$-level physical units to (x/Q+y/A) % n, wherein x is a logical address of the non-volatile memory, Q is a size of each of the $q^{th}$-level physical units, y is the user's access time, and A is a time cycle corresponding to the $q^{th}$-level physical units.

8. The device according to claim 7, wherein in migrating data in each of the $q^{th}$-level physical units to another $q^{th}$-level physical unit, the processor is configured to execute the data rotation program to implement the following steps:
   copying data in each of the $q^{th}$-level physical units to an external memory or an internal memory, and then copying the data from the external memory or the internal memory to the non-volatile memory to a location where the data of the $q^{th}$-level physical unit is rotated to.

9. The device according to claim 7, wherein in migrating data in each of the $q^{th}$-level physical units to another $q^{th}$-level physical unit, the processor is configured to execute the data rotation program to implement the following steps:

copying data in a $q^{th}$-level physical unit to an external memory or an internal memory, copying data in each of other $q^{th}$-level physical units one by one to a location of last copied data in the non-volatile memory, and then copying the data in the external memory or the internal memory to a location of a last copied data in the non-volatile memory.

10. The device according to claim 7, wherein before migrating data in each of the $q^{th}$-level physical units to another $q^{th}$-level physical unit, the processor is further configured to execute the data rotation program to implement the following step:

setting a time cycle corresponding to the $q^{th}$-level physical units based on a current working scenario.

11. A wear leveling and access device for a non-volatile memory, comprising: the non-volatile memory and a processor, wherein:

the processor is configured to execute a wear leveling and access program for the non-volatile memory to implement the following steps:

logically dividing the non-volatile memory into p levels of physical units, wherein the non-volatile memory comprises a plurality of 1st-level physical units, and each (p-1)$^{th}$-level physical unit comprises a plurality of $p^{th}$-level physical units, p being a positive integer greater than 1;

migrating, when a time cycle corresponding to $q^{th}$-level physical units arrives, data in each of the $q^{th}$-level physical units to another $q^{th}$-level physical unit, q being any positive integer from 1 to p; and setting, when a user accesses the non-volatile memory, a logical address of an $a^{th}$ physical unit among n $q^{th}$-level physical units to (x/Q+y/A) % n, wherein x is a logical address of the non-volatile memory, Q is a size of each of the $q^{th}$-level physical units, y is the user's access time, and A is a time cycle corresponding to the $q^{th}$-level physical units.

12. The device according to claim 11, wherein in migrating data in each of the $q^{th}$-level physical units to another $q^{th}$-level physical unit, the processor is configured to execute the wear leveling and access program for the non-volatile memory to implement the following steps:

copying data in each of the $q^{th}$-level physical units to a free location in the non-volatile memory or to an external memory or an internal memory, and then copying the data from the free location in the non-volatile memory or from the external memory or the internal memory to the non-volatile memory to a location where the data of the $q^{th}$-level physical unit is rotated to.

13. The device according to claim 11, wherein in migrating data in each of the $q^{th}$-level physical units to another $q^{th}$-level physical unit, the processor is configured to execute the wear leveling and access program for the non-volatile memory to implement the following steps:

copying data in a $q^{th}$-level physical unit to a free location in the non-volatile memory or to an external memory or an internal memory, copying data in each of other $q^{th}$-level physical units one by one to a location of last copied data in the non-volatile memory, and then copying the data at the free location in the non-volatile memory or in the external memory or the internal memory to a location of a last copied data in the non-volatile memory.

14. The device according to claim 11, wherein before migrating data in each of the $q^{th}$-level physical units to another $q^{th}$-level physical unit, the processor is further configured to execute the wear leveling and access program for the non-volatile memory to implement the following step:

setting a time cycle corresponding to the $q^{th}$-level physical units based on a current working scenario.

* * * * *